United States Patent [19]

Krahenbuhl

[11] Patent Number: 5,215,041
[45] Date of Patent: Jun. 1, 1993

[54] METHOD FOR THE MANUFACTURE OF ANIMAL LITTER AND ANIMAL LITTER

[75] Inventor: Mirjam Krahenbuhl, Liebstadt, Switzerland

[73] Assignee: Organ-Faser Technology Company N.V., Curacao, Netherlands

[21] Appl. No.: 774,474

[22] Filed: Oct. 10, 1991

Related U.S. Application Data

[63] Continuation of Ser. No. 682,988, Apr. 10, 1991, abandoned, which is a continuation-in-part of Ser. No. 507,662, Apr. 10, 1990, abandoned.

[30] Foreign Application Priority Data

Apr. 10, 1989 [DE] Fed. Rep. of Germany ....... 3911678

[51] Int. Cl.$^5$ ............................................. A01K 1/015
[52] U.S. Cl. ..................................... 119/172; 119/171
[58] Field of Search ........................ 119/171, 172, 173

[56] References Cited

U.S. PATENT DOCUMENTS

| 4,509,457 | 4/1985 | Durbye | 119/173 |
| 4,519,340 | 5/1985 | Dickey | 119/171 |
| 4,560,527 | 12/1985 | Harke et al. | 119/172 |
| 4,570,573 | 2/1986 | Lohman | 119/172 |
| 4,619,862 | 10/1986 | Sokolowski | 119/172 |
| 4,623,515 | 11/1986 | Frei et al. | 422/1 |
| 4,815,668 | 3/1989 | Frei | 241/23 |

FOREIGN PATENT DOCUMENTS

| 3105597 | 9/1982 | Fed. Rep. of Germany . |
| 3644826 | 7/1987 | Fed. Rep. of Germany . |

Primary Examiner—John G. Weiss
Attorney, Agent, or Firm—Scully, Scott, Murphy & Presser

[57] ABSTRACT

The invention relates to a novel method for the manufacture of animal litter using filler materials and additional materials that react with liquid. These filler materials are obtained from a fraction of domestic, industrial and other similar waste and/or paper slurry. The fraction obtained from the waste is pulverized and mixed with the additional materials, the mixture is adjusted to a specific moisture content, subsequently granulated, and the resulting granules with a predetermined particle size are separated.

The animal litter manufactured according to the invention ensures a high degree of odor retention, has high absorbing power and a low apparent density.

13 Claims, 2 Drawing Sheets

METHOD FOR THE MANUFACTURE OF ANIMAL LITTER AND ANIMAL LITTER

CROSS-REFERENCE TO RELATED APPLICATIONS

This application is a continuation of application Ser. No. 682,988, filed Apr. 10, 1991 now abandoned which is a continuation-in-part of application Ser. No. 507,662, filed Apr. 10, 1990, now abandoned.

TECHNICAL FIELD OF THE INVENTION

The invention relates to a method for the manufacture of animal litter. The animal litter made according to the invention is in a solid, granular form, exhibits a high degree of odour retention and has high absorbing power and low apparent density.

BACKGROUND OF THE INVENTION AND PRIOR ART

The known materials for the manufacture of litter for animals are essentially natural products of mineral origin such as pumice stone, bentonite, clay minerals, for example sepiolite, diatomite, or of organic origin such as wood flour, sawdust and peat which, because of their porous structure, have the property of absorbing liquids in their pores.

For years granulated drying and/or absorbing agents have been used for keeping household pets clean, especially in densely populated urban and suburban areas. Such products are mostly bought and used in large quantities by owners of small animals, in particular cats.

Nowadays a variety of products with very different properties is marketed under the name "cat litter". The majority of these products, as already mentioned above, are manufactured on a mineral basis.

An animal litter of this kind is known, for example, from DE-PS 31 21 403, which is made using a porous inorganic material with a pore structure. The porous material used here consists of calcium silicate granules and/or calcium silicate powder which has a pH-value between about 5.8 and 6.2. The known animal litter made from calcium silicate granules having a pore radius of less than 500 nm retains its shape and consistency and is bactericidal. However, after prolonged use of such materials an unpleasant smell develops so that the animal litter often has to be changed even though the absorbing capacity is by no means exhausted.

The afore-mentioned animal litter products with their different characteristics do, however, have further disadvantages. Their high specific gravity causes great practical problems in the supply and transportation of the packaged product Some of the animal litter preparations consist of sharp-edged—in particular broken—stones, which leads animals with paws to avoid the sharp granules.

DE-OS 36 44 826 describes an animal litter that consists of a mixture of filler materials, gypsum and catalysts, the materials being mixed when they are dry and compressed under high pressure. The process of forming by pressing in dies does, however, have many disadvantages, e.g. high consumption of energy, significant wear and high product density.

In relation to the weight of the product the take-up of liquid in many known products is very small. After reaching their absorptive capacity these products tend to swell and thus form clumps. This effect is still more marked in the case of diatomite, which becomes very sticky, greasy and even pasty. These disadvantageous properties necessarily lead to difficulties in handling such products. Because of these product characteristics the litter must also be changed often and as a result more is used.

In the manufacture of these animal litter materials a large proportion of fine dust is formed as a result of the way they are crushed, and by abrasion in the drums or other containers during storage, transport and handling between the manufacturer and consumer. Handling the open container in the pet owner's home raises a great deal of dust, especially when changing the litter in the boxes. In addition this high proportion of fine dust is bad for the animals, since they inhale the dust when scratching in such products.

After use, such water-insoluble stone and/or mineral animal litter products can only be disposed of as or with domestic waste. This causes the waste disposal plants to be burdened with a not insignificant amount of such waste products. In Switzerland and in the Federal Republic of Germany, for example, about 40,000 tons and 500,000 tons respectively of waste consisting of this kind of product accumulates each year. This shows that the market for such (albeit improved) animal litter products is very large, especially in densely populated urban and suburban areas.

OBJECT OF THE INVENTION

An object of the invention is to provide a method for the manufacture of an animal litter which overcomes the disadvantages of the prior art and ensures a high degree of odour retention, has high absorbing power and low apparent density. The new animal litter is intended to, fulfil the optimal requirements for man and animal with regard to quality and economy.

SUMMARY OF THE INVENTION

These objects are achieved according to the invention as claimed in the method claims 1 to 5. The nature and composition of the animal litter manufactured according to the invention is set forth in claims 6 to 14.

The method according to the invention differs from the known methods in particular in that a wet method is used. The spherical, granular animal litter manufactured in this way has the following specification: The granules have a stable porous surface of essentially bound additional material and a soft and absorbant core of filler material and essentially non-bound additional materials. The granules advantageously have a particle size selected to be in the range of 1 to 10 mm diameter and are spherical. In the final animal litter product spheres of all sizes are advantageously mixed together. In this product, however, the preferred particle size range is from 2 to 5 mm diameter. The granulate also has an apparent density in the range of 200 to 700 kg/m$^3$, advantageously in the range of 300 to 500 kg/m$^3$. The colour of the animal litter product according to the invention is greyish to brownish, and can to a large extent be adapted to the desires of the consumer.

For the first time a novel animal litter can thus be provided which consists of a granulate having a paper slurry and/or organic fibre basis, prepared from waste materials and additional materials. A pre-comminuted fibre and/or granulate fraction obtained from domestic, industrial and similar waste may be used, which can be manufactured according to DE-PS 31 05 597. By reutilizing slurry from the paper and pulp industry and/or from wet fibre plants a granulate can be produced in which all the substances (solid materials and liquids) can be recycled or utilised. By the use of paper slurry the burden on the environment can be further reduced, as hitherto this waste would have had to be dumped and destroyed.

The animal litter according to the invention is particularly useful as litter for cats.

Compared with known animal litter products the product manufactured according to the invention has the following advantages. The novel litter according to the invention is very easy to handle in comparison to known litter products because it has a low apparent density. In addition, the product according to the invention does not have a fine dust fraction and is abrasion-free according to the abrasion classification (modified SHELL-Index). Owing to its high absorbing power the litter according to the invention does not need to be changed frequently and thereby reduces use of large amounts so that a longer life or period of use are ensured. The product according to the invention can advantageously be disposed of down the drains or by domestic composting.

To sum up, the animal litter according to the invention has, compared with the known animal litter products, the great advantage that with the superior absorption or adsorption capacity (high absorbing power) of the granules according to the invention having a paper slurry and/or organic fibre basis, prepared from waste and used materials with the addition of diverse materials, such as lime, calcium hydroxide, gypsum and similar materials and a certain amount of residual moisture, it not only, as already mentioned, retains its shape and consistency but is also odour-retaining, bactericidal and easy to dispose of.

BRIEF DESCRIPTION OF THE DRAWING

The invention will now be described in more detail with reference to the following examples and the accompanying drawings, in which.

DETAILED DESCRIPTION OF PREFERRED EMBODIMENTS OF THE INVENTION

One method according to the subject invention utilizes organic fibers but no paper slurry. In this embodiment, the animal litter consists of:

(a) 55 to 65%/wt., preferably about 60%/wt., of organic fibers prepared from waste materials;
(b) 30 to 34%/wt., preferably about 32%/wt., of additional materials, such as lime, calcium hydroxide, gypsum and similar materials; and
(c) 6 to 10%/wt., preferably about 8%/wt. of water.

Another method according to the subject invention utilizes both organic fibers and paper slurry. In this embodiment, the animal litter consists of:

(a) 35 to 75%/wt., preferably about 54%/wt., of slurry from at least one of the paper and pulp industry and wet fiber plants;
(b) 25 to 35%/wt., preferably about 25%/wt., of organic fibers prepared from waste material;
(c) 10 to 20%/wt., preferably about 13%/wt., of additional materials, such as lime, calcium hydrate, gypsum and similar materials; and
(d) 6 to 10%/wt., preferably about 8%/wt., of water.

The most preferred embodiments appear below in the Examples.

EXAMPLE 1

Figure 1:
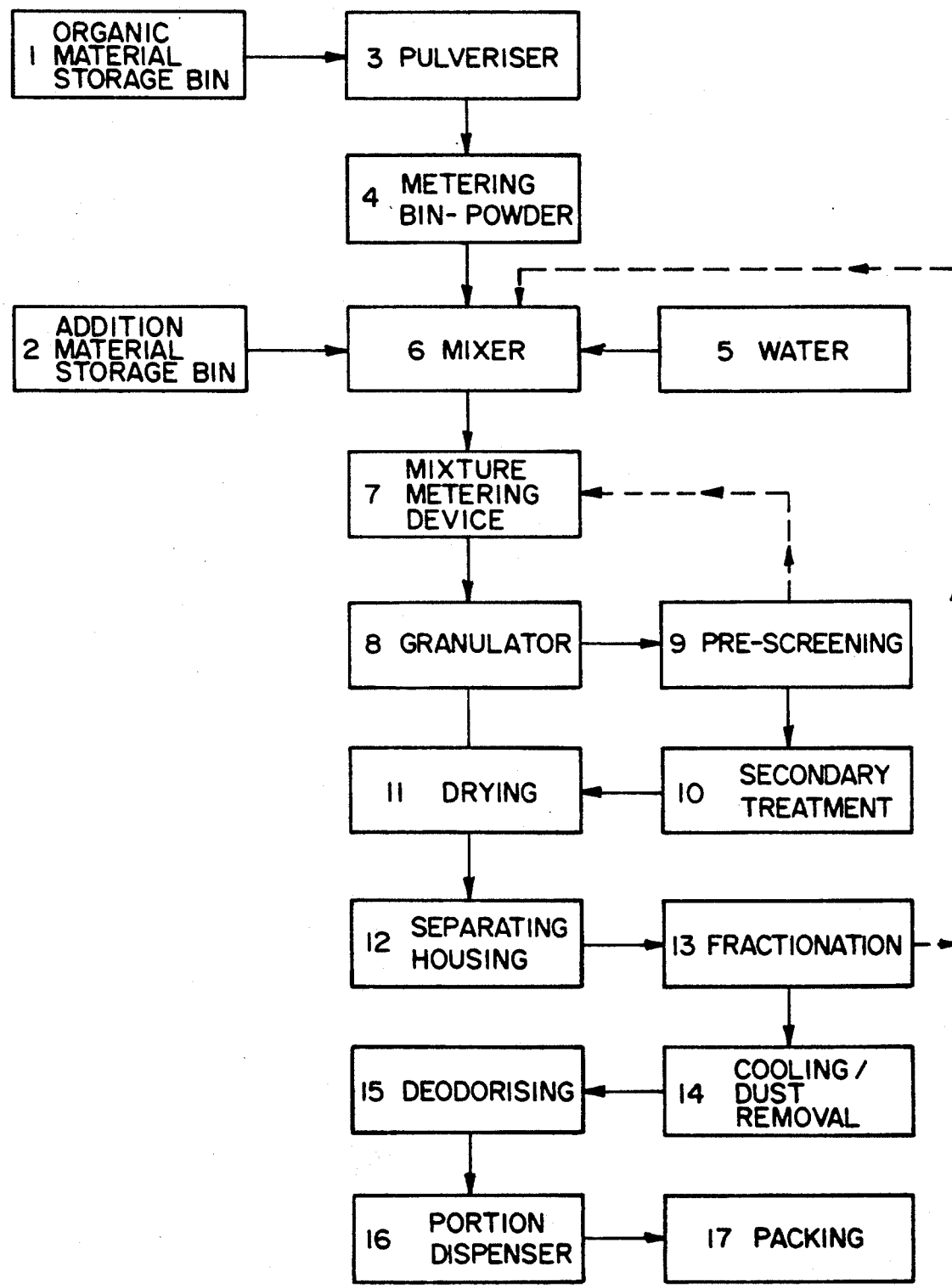
FIG. 1 shows a flow diagram of the method according to the invention for the manufacture of an animal litter on the basis of organic fibres prepared from waste and used materials.

The manufacture according to the invention of the novel animal litter having a pre-comminuted organic fibre basis, prepared from waste materials, was carried out as follows, with reference to FIG. 1.

The following starting materials were used:

| | |
|---|---|
| approx. 60%/wt. | organic fibres, prepared from waste and used materials (according to DE-PS 31 05 597), |
| approx. 32%/wt. | lime or calcium hydroxide or gypsum, |
| approx. 8%/wt. | water. |

The organic fibres, prepared from mixed domestic, industrial and other such waste, which can be manufactured according to DE-PS 31 05 597, are stored in a storage bin 1. The pre-comminuted organic waste materials are withdrawn in measured amounts from this bin 1 and delivered to a pulverizer 3.

Position 3 then pulverises these materials to dust and the powder made in this way is transported pneumatically (not shown) to a metering bin 4.

This position 4 then conveys the powder to a mixer 6. The additional materials (lime, calcium hydroxide, gypsum or similar materials) are then metered from a storage bin 4 according to a special formula and sequence and are likewise supplied to the mixer 6.

Water metered from a device 5 is then conveyed to the mixer. This mixer (position 6) can be a known cyclic batch mixer, having the function of mixing the components according to a special program. A conveyor (not shown) conveys the finished mixture to a mixture metering device 7. This mixture metering device has the following functions:

a) Storing the mixture and
b) metering the mixture.

A mechanical conveyor (not shown) then transports the mixture metered from the mixture metering device 7 to a granulating device 8. The function of the granulating device 8, which in an embodiment of the invention comprises a rotating drum, is to spheroidise the mixed material. The speed, inclination and residence time of the mixture are important for determining its shape. The granulating device can alternatively comprise a plate or a worm.

The granules obtained are conveyed from position 8 (granulating device) directly to a pre-screening device 9. This pre-screening device 9 separates the oversized granules from those with the maximum final size (10 mm diameter). A conveyor (not shown) transports the oversize pieces back to the mixture metering device 7.

The granules are then conveyed to a secondary treatment device 10 by a conveyor (not shown).

The function of the secondary treatment device (position 10) is to dust the granules with a mineral powder, the powder providing a deodorizing function to the animal litter product. A conveyor (not shown) then transports the dusted granules to a drier 11. This drier 11 comprises a rotating drum with a heating device (not shown) arranged before it. The function of position 11 is to dry the granules at a specific temperature, while continually moving and rolling them, from about 40 to 70% water content to a maximum water content of 8%/wt. without the granules being damaged or deformed. At the end of this drying phase hard granules are formed which are conveyed directly to a separating housing 12.

The separating housing (position 12) comprises a settling chamber and a granule discharge outlet and separates the granules from the steam-air mixture that has been formed during drying.

The granules are then taken by a conveyor (not shown) from the outlet of the separating housing 12 and transported to a fractionating device 13. The position 13 (fractionating device) separates the granules into two grain sizes. In the method according to the invention the fine grain material, advantageously less than 1 mm diameter, is supplied to the mixer 6 for recycling by a conveyor (not shown).

The product (granulate) obtained is supplied to a cooling/dust-removing device 14 likewise by a transporting unit (not shown).

The function of this position 14 (cooling/dust-removing device), in which there are built-in fans, is to cool the product, which is still hot, to room temperature and simultaneously remove the dust. The cooled product is then conveyed directly to a deodorizing device 15. Position 15 (deodorizing device) comprises a swinging container with a pneumatic injection device and its function is to spray the product uniformly with the preset fragrance note.

A transporter (not shown) conveys the finished animal litter product to a portion dispensing device 16.

This dispensing device 16 divides the product stream into portions of the predetermined commercial size and passes these directly to a packaging device 17. Position 17 (packaging) takes the portions and fills them into bags, which are then sealed immediately and stacked in a container.

EXAMPLE 2

Figure 2:
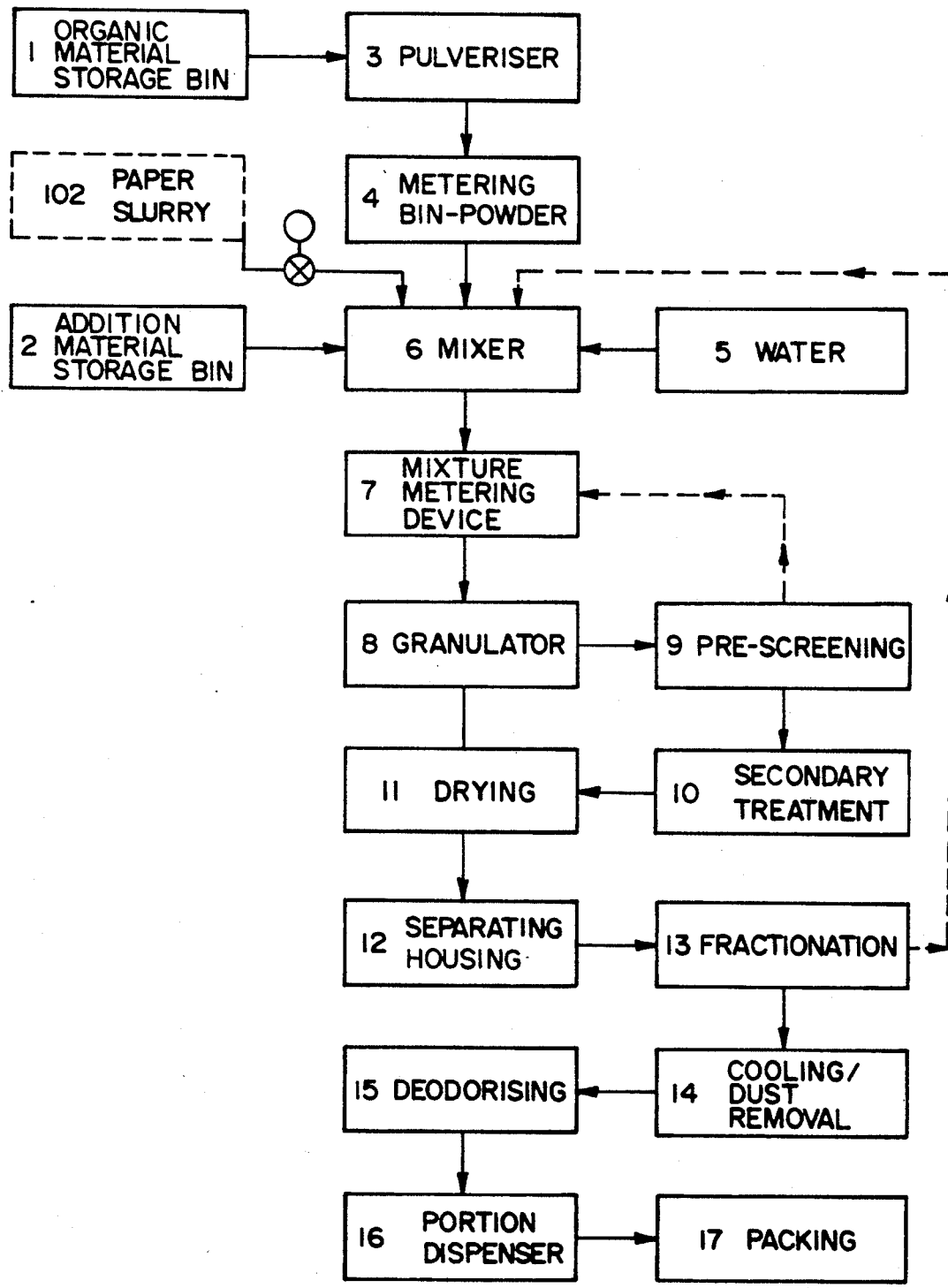
FIG. 2 shows a flow diagram for the method according to the invention using paper slurry.

The method according to the invention for the manufacture of the new animal litter having a paper slurry basis was carried out as follows, with reference to FIG. 2.

The following starting materials were used:

| approx. 54%/wt. | paper slurry |
| approx. 25%/wt. | organic fibres |
| approx. 13%/wt. | lime, calcium hydroxide and/or gypsum, |
| approx. 8%/wt. | water |

The delivered paper slurry is poured into the collecting bin 102 equipped with special devices. A built-in measuring device determines the dry substance and H$_2$O contents. A metering device (not shown) meters the required amount of slurry from the computing device and from the mixer 6 to the screw conveyor which transports the slurry to the mixer.

After the slurry has been poured in the mixer is started up and water is added from position 5 with continuous stirring until it becomes an aqueous, free-flowing solution.

When the mass is in this soluble form it can be mixed and combined. Subsequently lime and other additional materials are added in measured amounts from bin 2, likewise with continuous stirring.

When the batch of mixture has been thoroughly mixed and dissolved pulverized organic fibres are added to the mass from bin 4 with continuous stirring until the desired moisture content of the mixture is attained. The mixture is stirred and kneaded until all the materials have dissolved and combined so that they can be conveyed via the mixture metering device 7 to the granulating device at position 8.

The other process steps after the mixer 6 are the same as those described in Example 1.

The average material parameter values of the animal litter granules obtained according to the invention were as follows:

| | |
|---|---|
| apparent density | approx. 400 kg/m$^3$ |
| moisture/liquid absorption capacity | between 90 and 120 g water/ 100 g litter |
| particle size | in the range of 2 to 5 mm |
| colour | light grey |
| water content | 7.7% |
| loss at red heat | 56.1% |
| Abrasion (mod. SHELL-Index) | 1.8°/oo at 6 kg/cm$^2$ |

The products manufactured in this way according to the method of the invention and having a paper slurry and/or organic fibre basis, prepared from waste and used materials, can be used with advantage as animal litter, in particular as litter for cats. As shown above the product according to the invention is superior to known commercial products in respect of apparent density, absorption of moisture/liquid and abrasive behaviour. Since the new product according to the invention is also superior to known commercial products in respect of odour-retaining power and in the other ways mentioned above it is suitable for use as a superior animal litter, in particular as litter for cats.

What is claimed is:

1. A method for the manufacture of animal litter having a high degree of odour retention, high absorbing power and a low apparent density, by forming a granulate using filler materials and additional materials that react with liquid, wherein the filler materials are pulverized and mixed with the additional materials and this starting mixture is adjusted to a specific moisture content, formed into approximately spherical granules, whereafter the granules are dusted with minerals and then dried and cooled and treated to removed dust, and the resulting granules having a predetermined particle size are separated.

2. A method for the manufacture of animal litter according to claim 1, wherein the shaping of the granules takes place in a drying step in a rotating drum.

3. A method for the manufacture of animal litter according to claim 1, wherein the moisture content of the mixture is adjusted to about 40-70% water content and the shaped and dried granules have a maximum water content of 8%.

4. A method for the manufacture of animal litter according to claim 1, wherein the granules remaining after the separation are returned to the mixture.

5. Animal litter having a high degree of odour retention, high absorbing power and a low apparent density produced by forming a granulate using filler materials and additional materials that react with liquid, wherein the filler materials are pulverized and mixed with additional materials and this starting mixture is adjusted to a specific moisture content and formed into spherical granules, whereafter the granules are dusted with minerals and then dried, cooled and treated to remove dust, said granules having a stable, porous surface of essentially bound additional materials and a soft, absorbent core of filler materials and essentially non-bound additional materials, the resulting granules having a predetermined particle size.

6. Animal litter made according to claim 5, wherein said filler materials consist of a fibre fraction obtained from domestic, industrial and similar waste and the additional materials are selected from lime, calcium hydroxide.

7. Animal litter according to claim 6, wherein said filler materials comprise paper slurry.

8. Animal litter according to claim 6, wherein said filler materials comprise paper slurry and organic fibres and the initial moisture content is set by the ratio of paper slurry and organic fibres.

9. Animal litter according to claim 6, wherein said litter consists of:
   a) 55 to 65%/wt., preferably about 60%/wt., of organic fibres prepared from waste materials,
   b) 30 to 34%/wt., preferably about 32%/wt., of additional materials such as lime, calcium hydroxide, gypsum,
   c) 6 to 10%/wt., preferably about 8%/wt. water.

10. Animal litter according to claim 8, wherein said litter consists of:
   a) 35 to 75%/wt., preferably about 54%/wt., of slurry from at least one of the paper and pulp industry and wet fibre plants,
   b) 25 to 35%/wt., preferably 25%/wt., organic fibres prepared from waste materials
   c) 10 to 20%/wt., preferably about 13%/wt., additional materials such as lime, calcium hydrate, gypsum,
   d) 6 to 10%/wt., preferably about 8%/wt., water.

11. Animal litter made according to claim 5, wherein the minerals used for dusting simultaneously act as deodorant.

12. Animal litter made according to claim 5, wherein said granules have a particle size in the range of 1 to 10 mm, preferably in the range of 2 to 5 mm.

13. Animal litter made according to claim 5, wherein said granules have an apparent density in the range of 200 to 700 kg/m$^3$, preferably in the range of 300 to 500 kg/m$^3$, and a moisture/liquid take-up capacity of between 90 and 120 g water/100 g litter.

* * * * *